United States Patent
Sakamoto et al.

(10) Patent No.: US 9,440,593 B2
(45) Date of Patent: Sep. 13, 2016

(54) VEHICLE MOUNTING STRUCTURE FOR ELECTRONIC DEVICE

(71) Applicants: Yusuke Sakamoto, Okazaki (JP); Kenshi Yamanaka, Nukata-gun (JP)

(72) Inventors: Yusuke Sakamoto, Okazaki (JP); Kenshi Yamanaka, Nukata-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/391,189

(22) PCT Filed: Dec. 6, 2013

(86) PCT No.: PCT/IB2013/002710
§ 371 (c)(1),
(2) Date: Oct. 8, 2014

(87) PCT Pub. No.: WO2014/091287
PCT Pub. Date: Jun. 19, 2014

(65) Prior Publication Data
US 2015/0283955 A1    Oct. 8, 2015

(30) Foreign Application Priority Data

Dec. 10, 2012  (JP) ................. 2012-269130

(51) Int. Cl.
| | |
|---|---|
| F16M 1/00 | (2006.01) |
| B60R 11/00 | (2006.01) |
| B60K 1/00 | (2006.01) |
| B60L 15/00 | (2006.01) |
| F16B 5/02 | (2006.01) |
| B60L 11/18 | (2006.01) |
| F16B 5/06 | (2006.01) |

(52) U.S. Cl.
CPC ............. *B60R 11/00* (2013.01); *B60K 1/00* (2013.01); *B60L 11/1877* (2013.01); *B60L 15/007* (2013.01); *F16B 5/0241* (2013.01); *F16B 5/0258* (2013.01); *B60L 2270/145* (2013.01); *B60R 2011/0038* (2013.01); *B60R 2011/0043* (2013.01); *B60Y 2400/61* (2013.01); *F16B 5/065* (2013.01); *Y02T 10/645* (2013.01); *Y02T 10/7005* (2013.01); *Y02T 10/705* (2013.01)

(58) Field of Classification Search
USPC ........ 248/638, 640, 674, 675, 560, 200, 201
See application file for complete search history.

(56) References Cited

U.S. PATENT DOCUMENTS

| | | | | |
|---|---|---|---|---|
| 4,247,061 A | * | 1/1981 | Kuczynski | ............... B64C 1/00 244/17.11 |
| 4,849,667 A | * | 7/1989 | Morrill | ................. H02K 15/14 248/674 |
| 6,543,741 B1 | * | 4/2003 | Li | ....................... F04B 39/0044 248/638 |
| 2004/0211613 A1 | | 10/2004 | Asao et al. | |
| 2011/0058318 A1 | | 3/2011 | Tsuchida | |
| 2014/0367547 A1 | * | 12/2014 | Ohnishi | ................... F16F 1/36 248/638 |

FOREIGN PATENT DOCUMENTS

| | | |
|---|---|---|
| DE | 102009015414 A1 | 9/2010 |
| JP | 50-127134 U | 4/1974 |

(Continued)

*Primary Examiner* — Steven Marsh
(74) *Attorney, Agent, or Firm* — Kenyon & Kenyon LLP (57) ABSTRACT

The vehicle mounting structure comprises an electronic device, a first bracket, a drive train and a first vibration isolating bush. The electronic device is fixed on the drive train via the first bracket, and the electronic device and the drive train define a gap therebetween. The first vibration isolating bush is provided between the first bracket and the electronic device.

2 Claims, 9 Drawing Sheets

(56) References Cited

FOREIGN PATENT DOCUMENTS

| | | |
|---|---|---|
| JP | H08-290720 A | 11/1996 |
| JP | 2004-328870 A | 11/2004 |
| JP | 2008-248936 A | 10/2008 |
| JP | 2011-060367 A | 3/2011 |
| JP | 2011-115013 A | 6/2011 |
| JP | 2011-131704 A | 7/2011 |
| WO | 2012/114491 A1 | 8/2012 |
| WO | 2013/168227 A1 | 11/2013 |

* cited by examiner

VEHICLE MOUNTING STRUCTURE FOR ELECTRONIC DEVICE

CROSS-REFERENCE TO RELATED APPLICATIONS

This is a national phase application based on the PCT International Patent Application No. PCT/IB2013/002710 filed Dec. 6, 2013, claiming priority to Japanese Patent Application No. 2012-269130 filed Dec. 10, 2012, the entire contents of both of which are incorporated herein by reference.

BACKGROUND OF THE INVENTION

1. Field of the Invention

The art disclosed by the present specification relates to a vehicle mounting structure for an electronic device in an engine room or a motor room.

2. Description of Related Art

An engine room or motor room of a vehicle is mounted with various devices including an engine or a running motor. In recent years in particular, electric vehicles including hybrid vehicles have been in widespread use, and these vehicles have been mounted with various electronic devices. An inverter that generates an alternating electric current for driving the running motor is a typical electronic device mounted on a vehicle. Various ingenuities have been proposed as to the mounting of important electronic devices, especially inverters.

For example, in Japanese Patent Application Publication No. 2004-328870 (JP-2004-328870 A), there is disclosed a structure in which an inverter is fixed above a motor with a gap therebetween. Besides, in Japanese Patent Application Publication No. 2008-248936 (JP-2008-248936 A) and Japanese Patent Application Publication No. 2011-115013 (JP-2011-115013 A), there is disclosed a structure in which an inverter is fixed to a vehicle body via a rubber vibration isolator. A mounting metal fitting for fixing an electronic device to a vehicle body or another component is often referred to as a bracket. In the present specification as well, a metal fitting for mounting an electronic device is referred to as a bracket. As disclosed in Japanese Patent Application Publication No. 2008-248936 (JP-2008-248936 A) and Japanese Patent Application Publication No. 2011-115013 (JP-2011-115013 A), a bracket and a rubber vibration isolator are often used as a set. Besides, in Japanese Patent Application Publication No. 8-290720 (JP-8-290720 A), a set of a bracket and a rubber vibration isolator is used to fix a motor to a vehicle body. The bracket of Japanese Patent. Application Publication No. 8-290720 (JP-8-290720 A) is provided with a flange for increasing the strength thereof.

SUMMARY OF THE INVENTION

In Japanese Patent Application Publication No. 2004-328870 (JP-2004-328870 A), there is disclosed an art of fixing the inverter (the electronic device) above the motor with the gap therebetween. In such a structure, the electronic device vibrates due to vibrations of the motor or vibrations of the vehicle. In order to suppress the vibrations, it is conceivable to insert a vibration isolating member between the motor and the electronic device. A rubber vibration isolator or a vibration isolating bush is typically used as the vibration isolating member. Incidentally, the source of vibrations is not limited to the motor, but may be an engine or a transmission. It should be noted herein that one of the motor, the engine and the transmission or a composite unit constituted of some of them is referred to as "a drive train". The present specification relates to a structure for mounting an electronic device on a drive train with a gap therebetween, improves an insertion spot for a vibration isolating member or a structure thereof, and provides a vehicle mounting structure that is more excellent than before.

In one vehicle mounting structure disclosed in the present specification, an electronic device is fixed on a drive train with a gap therebetween by a bracket, and a vibration isolating bush is attached between the bracket and the electronic device. The gap is provided between the drive train and the electronic device with a view to making vibrations of the drive train unlikely to be transmitted to the electronic device, thermally isolating the electronic device from the drive train, and increasing the efficiency of the wiring of cables (wire harnesses) through the use of the gap.

A vehicle mounting structure for an electronic device disclosed by the present specification is configured as follows. The vehicle mounting structure comprises an electronic device, a first bracket, a drive train and a first vibration isolating bush. The electronic device is fixed on the drive train via the first bracket, and the electronic device and the drive train define a gap therebetween. The first vibration isolating bush is provided between the first bracket and the electronic device.

Furthermore, the aforementioned vehicle mounting structure may be configured as follows. The vehicle mounting structure further comprises a first bolt that fastens the first bracket and the electronic device via the first vibration isolating bush. The first vibration isolating bush includes a first inner bush, a first outer bush, and a first elastic member. The first inner bush is equipped with a first flange and a first tube portion has a tubular shape. The first outer bush is equipped with a second flange and a second tube portion that has a tubular shape. The first tube portion is provided inside the second tube portion, and the first flange and the second flange overlap with each other. The first elastic member is provided between the first inner bush and the first outer bush. The first bracket is connected to a front face of the electronic device that is oriented forward with respect to the vehicle. The first vibration isolating bush is attached such that the second flange abuts on a face of the first bracket that is oriented forward with respect to the vehicle, and that the second tube portion penetrates the first bracket. The first bolt penetrates the first tube portion, with a longitudinal direction of the first bolt oriented substantially perpendicularly to the front face of the electronic device. A tip of the first bolt is screwed to the electronic device, and a head of the first bolt abuts on a face of the first flange of the first vibration isolating bush that is oriented to the frontward of the vehicle.

Furthermore, the aforementioned vehicle mounting structure may be configured as follows. The vehicle mounting structure further comprises a second bolt, a second vibration isolating bush, and a second bolt. The second bolt is connected to a rear face of the electronic device that is oriented rearward with respect to the vehicle. The second vibration isolating bush includes a second inner bush, a second outer bush, and a second elastic member. The second inner bush is equipped with a third flange and a third tube portion that has a tubular shape. The second outer bush is equipped with a fourth flange and a fourth tube portion that has a tubular shape. The fourth tube portion is provided inside the third tube portion, and the third flange and the fourth flange overlap with each other. The second elastic member is provided between the second inner bush and the second outer bush. The second bolt fastens the second bracket and the electronic device via the second vibration isolating bush. The second vibration isolating bush is attached such that the fourth flange abuts on a face of the second bracket that is oriented rearward with respect to the vehicle, and that the fourth tube portion penetrates the second bracket. The second bolt penetrates the third tube portion, with a longitudinal direction of the second bolt oriented substantially perpendicularly to the rear face of the electronic device. A tip of the second bolt is screwed to the electronic device, and a head of the second bolt abuts on a face of the third flange that is oriented rearward with respect to the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
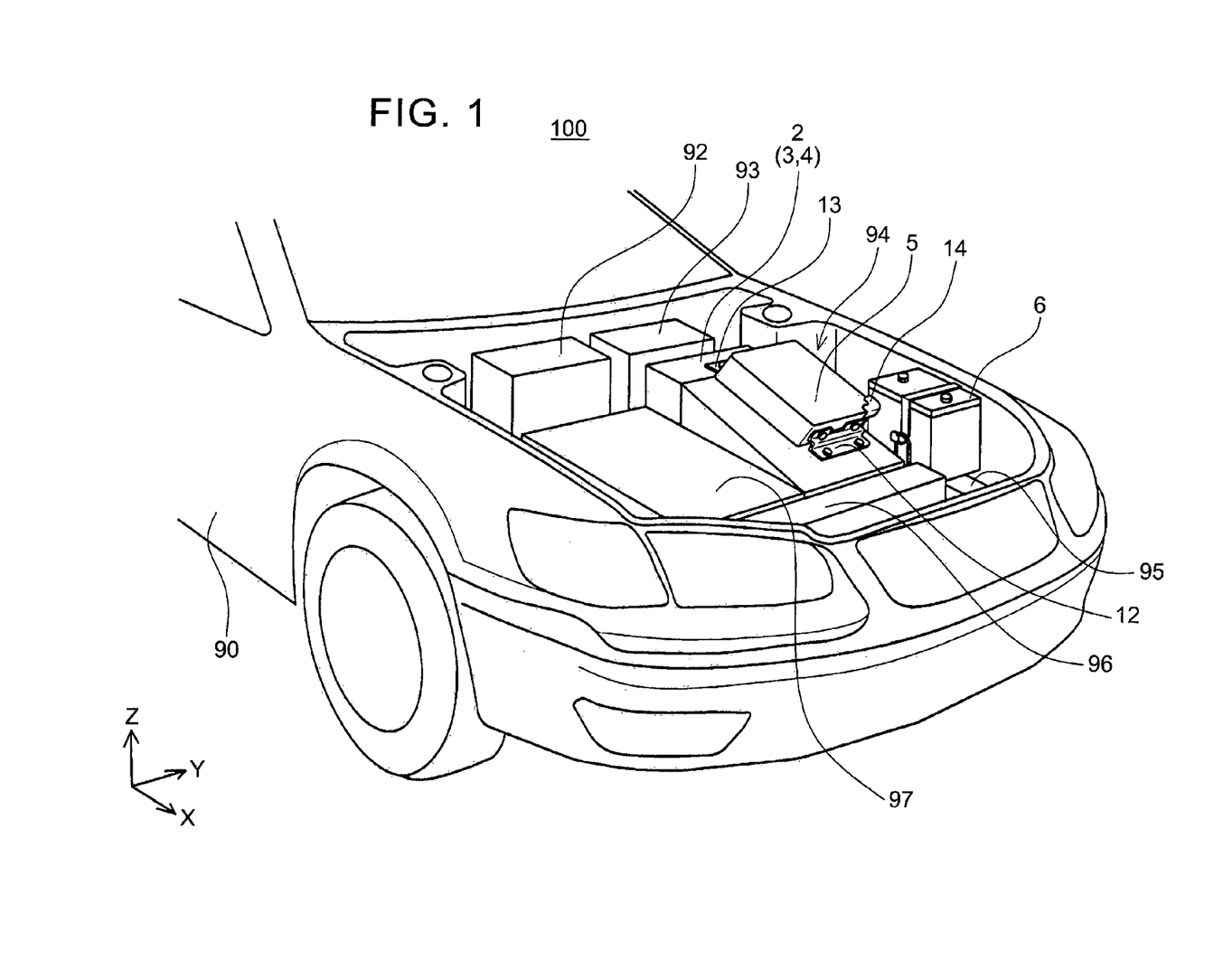
FIG. 1 is a perspective view showing an example of a device layout in an engine room.

A vehicle mounting structure according to each of the embodiments of the invention will be described with reference to the drawings. The vehicle mounting structure according to each of the embodiments of the invention relates to the mounting of an inverter 5 in an engine room 94 of a hybrid vehicle 100 that is equipped with a motor and an engine for driving wheels. FIG. 1 shows a device layout in the engine room 94 of the hybrid vehicle 100. It should be noted that FIG. 1 depicts the shapes of devices in the engine room in a simplified manner. Besides, an X-axis direction in the drawing corresponds to a forward direction with respect to the vehicle, a Y-axis direction in the drawing corresponds to a lateral direction with respect to the vehicle, and a Z-axis direction in the drawing corresponds to an upward direction with respect to the vehicle. Incidentally, a negative direction of the X-axis corresponds to a rearward direction with respect to the vehicle.

The main devices mounted in the engine room 94 are an engine 97, a drive train 2, an auxiliary battery 6, a radiator 96, and the inverter 5 that supplies an alternating-current electric power to the motor. Moreover, a relay box is denoted by a reference numeral 92, and a compressor of an air-conditioner is denoted by a reference numeral 93. A first motor 3 and a second motor 4 that drive the wheels, a transmission that amplifies output torques of the motor and the engine, and a differential gear are stored in the drive train 2.

The engine 97 and the drive train 2 are fixed to a side frame 95 that constitutes a frame of a chassis. The side frame is also referred to as a side member. The radiator 96 is fixed to a front frame (not shown) that constitutes part of the frame. The front frame is also referred to as a front bumper reinforcement. A body 90 of the vehicle is also supported by the side frame 95 and the front frame.

The drive train 2 is a hybrid vehicle transaxle. An upper face of the drive train 2 is inclined forward. The inverter 5 is fixed to the upper face. The inverter 5 is fixed by a front bracket 12 and a rear bracket 13, with a gap Sp (which will be described later) left between the inverter 5 and the upper face of the drive train 2. The vehicle mounting structure of the inverter 5 will be described later in detail.

The auxiliary battery 6 is located on the left side in front of the inverter 5 with respect to the vehicle. The auxiliary battery 6 supplies electric power to low electric power devices such as a car audio system, a room lamp and the like. Incidentally, although not shown in the drawing, a high-output main battery for the motors 3 and 4 for driving the wheels is stored below a rear seat or in a rear compartment.

Figure 2:
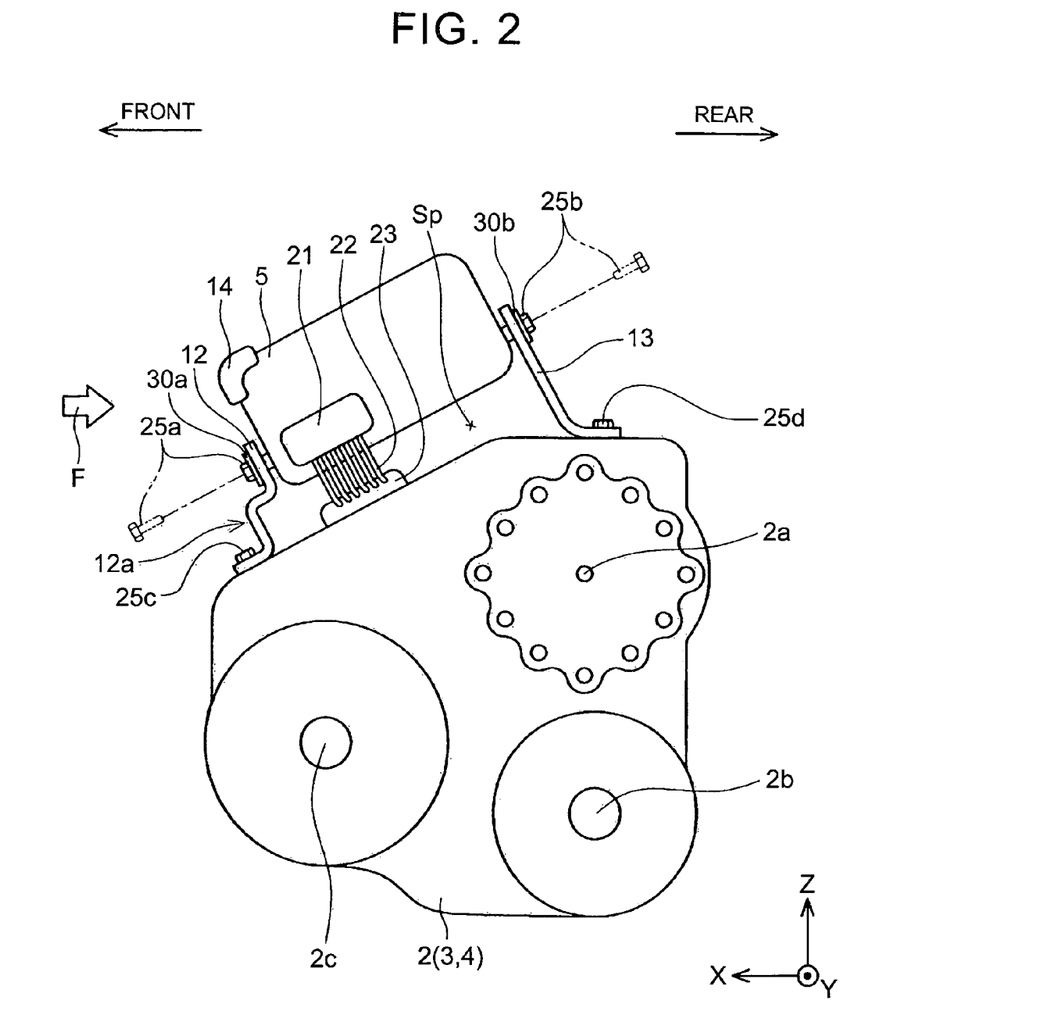
FIG. 2 is a lateral view of a drive train and an inverter that is fixed to an upper portion thereof.
Figure 3:
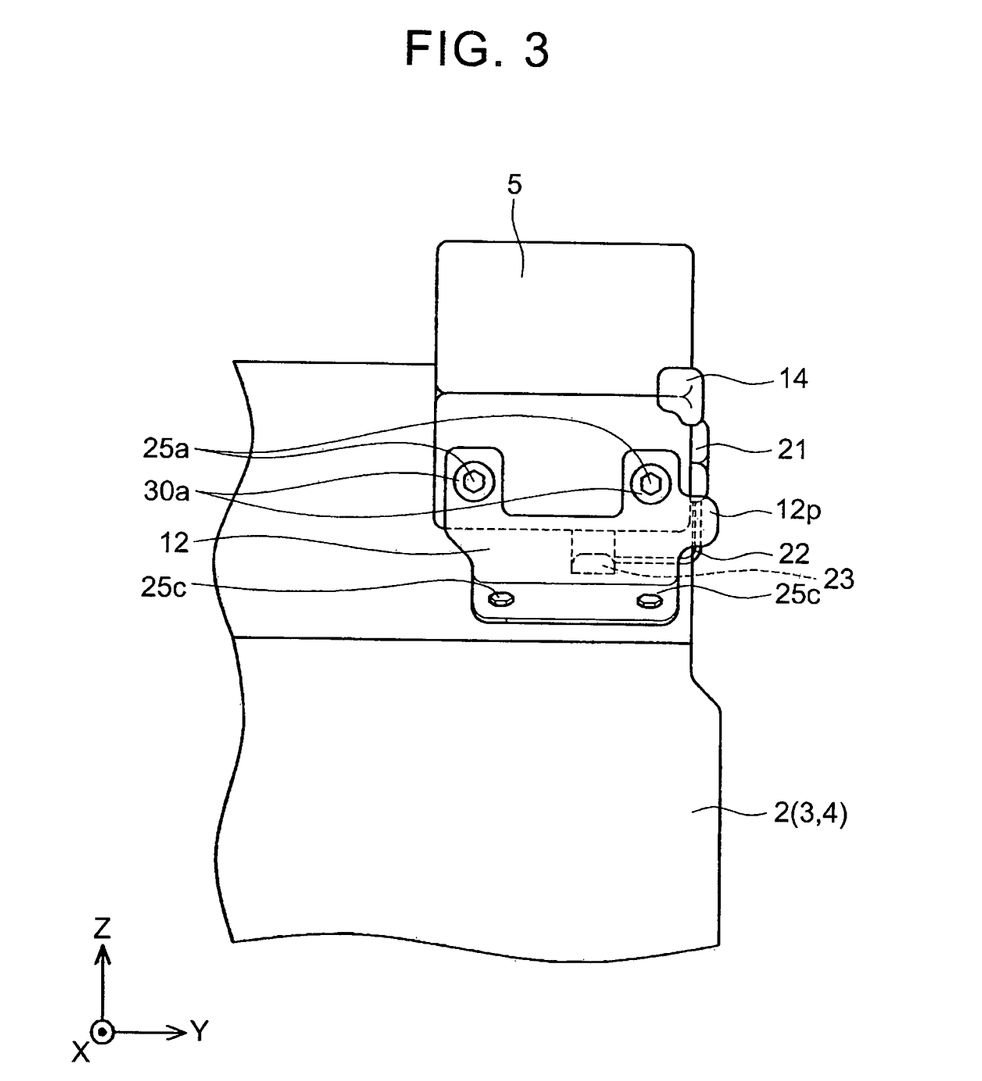
FIG. 3 is a front view of the inverter that is fixed to the upper portion of the drive train.
Figure 4:
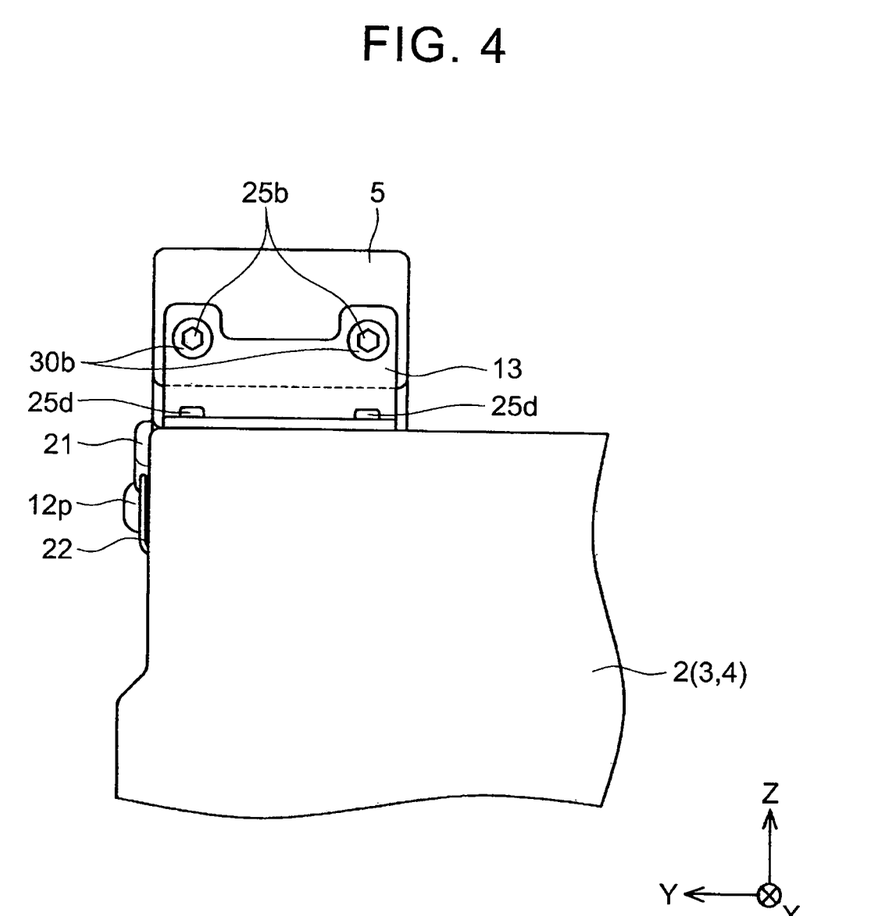
FIG. 4 is a rear view of the inverter that is fixed to the upper portion of the drive train.

The vehicle mounting structure of the inverter 5 will be described in detail with reference to FIGS. 2 to 5. FIG. 2 is a lateral view of the inverter 5 that is fixed to an upper portion of the drive train 2. FIG. 3 is a front view of the inverter 5 that is fixed to the upper portion of the drive train 2, and FIG. 4 is a rear view of the inverter 5 that is fixed to the upper portion of the drive train 2. The drive train 2 has the two motors 3 and 4 (or motor-generators), a planetary gear, and a differential gear built therein. The planetary gear synthesizes outputs of the two motors and an output of the engine with one another. The drive train 2 is configured such that main shafts $2a$ and $2b$ of the two motors 3 and 4 and a shaft $2c$ of the differential gear extend parallel to the lateral direction with respect to the vehicle. The upper face of the drive train 2 is inclined forward. The inverter 5 is fixed to the upper face of the drive train 2 by the front bracket 12 and the rear bracket 13. The inverter 5 is fixed above the drive train 2 with the gap Sp therebetween by the front bracket 12 and the rear bracket 13.

The front bracket 12 and the rear bracket 13 are made of for example, iron. The front bracket 12 fixes a front face of the inverter 5, and the rear bracket 13 fixes a rear face of the inverter 5. The inverter 5 is also fixed in such a manner as to be inclined forward. Incidentally, the front face of the inverter 5 is equivalent to a lateral face of the inverter 5 that is oriented forward with respect to the vehicle. By the same token, the rear face of the inverter 5 is equivalent to a lateral face of the inverter 5 that is oriented rearward with respect to the vehicle.

Two fixation spots of the front bracket 12 on the drive train 2 side, which are arranged side by side in the lateral direction with respect to the vehicle, are fixed by bolts $25c$ respectively. Besides, two fixation spots of the front bracket 12 on the inverter 5 side, which are arranged side by side in the lateral direction with respect to the vehicle, are fixed by bolts $25a$ respectively. Vibration isolating bushes $30a$ are attached between the front bracket 12 and the front face of the inverter 5. The bolts $25a$ penetrate the vibration isolating bushes $30a$ respectively together with the front bracket 12 substantially perpendicularly to the front face of the inverter 5, and are screwed to the inverter 5. Two fixation spots of the rear bracket 13 on the drive train 2 side, which are arranged side by side in the lateral direction with respect to the vehicle, are fixed by bolts 25*d* respectively. Two fixation spots of the rear bracket 13 on the inverter side, which are arranged side by side in the lateral direction with respect to the vehicle, are fixed by bolts 25*b* respectively. Vibration isolating bushes 30*b* are attached between the rear bracket 13 and the rear face of the inverter 5. The bolts 25*b* penetrate the vibration isolating bushes 30*b* respectively together with the rear bracket 13 substantially perpendicularly to the rear face of the inverter 5, and are screwed to the inverter 5. As indicated by an alternate long and short dash line in FIG. 2, the bolts 25*a* and the bolts 25*b*, which fix the inverter 5, extend in a longitudinal direction with respect to the vehicle. Incidentally, the expression "in such a manner as to be oriented in the longitudinal direction with respect to the vehicle" means a state of being substantially along the longitudinal direction with respect to the vehicle. In this embodiment of the invention, the upper face of the drive train 2 is inclined forward with respect to the vehicle, whereby the inverter 5 is also inclined forward with respect to the vehicle. That is, the bolts 25*a* and 25*b* are screwed into the inverter 5 at the same angle as an angle of forward inclination of the inverter 5.

A connector 21 of a cable that supplies electric power to the motors is attached on a lateral face of the inverter 5 in the lateral direction with respect to the vehicle. Power cables 22 extend from the inverter 5 and path through the gap Sp, in the present case, since the hybrid vehicle 100 is equipped with the two three-phase drive motors 3 and 4, six power cables 22 extend from the inverter 5. The power cables 22 pass through the gap Sp between the inverter 5 and the drive train 2, and are connected by a connector 23 that is provided on the upper face of the drive train 2. One of the advantages of providing the gap Sp between the inverter 5 and the drive train 2 consists in that the power cables 22 can be passed through the gap Sp, and that the inverter 5 and the motors 3 and 4 can be connected to one another at a short distance.

The configuration of the front bracket 12, the rear bracket 13 and the gap Sp reduces the possibility of the power cables 22 being ruptured in the event of a collision of the vehicle. A reference symbol F of FIG. 2 denotes an impact that is applied to the inverter 5 in the event of a collision of the vehicle. If the impact denoted by the reference symbol F is applied to a region in front of the inverter 5, the front bracket 12 and the rear bracket 13 tumble rearward, and the inverter 5 retreats and sinks into the gap Sp. That is, upon receiving the impact from the region in front of the inverter 5, the inverter 5 moves rearward and downward. The deformation of the front bracket 12 and the rear bracket 13 and the movement of the inverter 5 soften an impact force. Furthermore, if the inverter 5 moves rearward and downward, the inverter 5 approaches the upper face of the drive train 2. That is, the distance between the connector 21 and the connector 23 decreases. Therefore, the possibility of the power cables 22 being ruptured is low in the event of a collision. Incidentally, a protector 14 that protects the inverter 5 from the impact of the collision is attached to an upper-left corner portion of the inverter 5.

The vibration isolating bushes 30*a* are provided between the front bracket 12 and the front face of the inverter 5, and the vibration isolating bushes 30*b* are provided between the rear bracket 13 and the rear face of the inverter 5. The vibration isolating bushes 30*a* and 30*b* are identical in structure to each other. The front vibration isolating bushes 30*a* and the rear vibration isolating bushes 30*b* will be referred to hereinafter as "vibration isolating bushes 30" in the case where they are treated without being distinguished from each other. Besides, the front bracket 12 and the rear bracket 13 will be referred to as "brackets" in the case where they are treated without being distinguished from each other.

Figure 5:
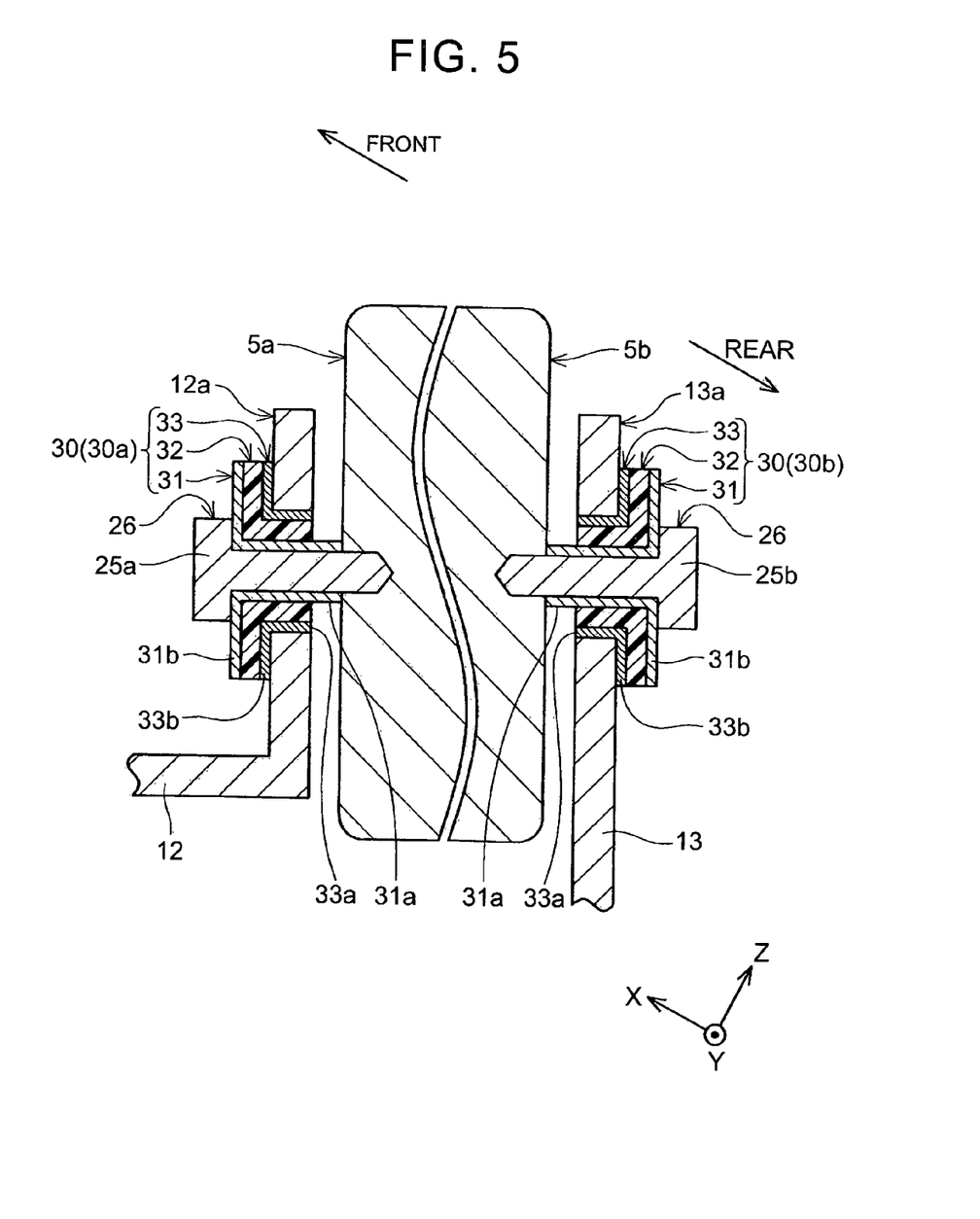
FIG. 5 is a cross-sectional view of a rubber vibration isolator.

FIG. 5 is a cross-sectional view showing the vibration isolating bushes 30. It should be noted that a coordinate system is inclined in FIG. 5 such that the inverter 5 is horizontally depicted, with a view to helping the understanding of the drawing. Besides, as shown in FIG. 3 and FIG. 4, while the inverter 5 is fixed at the two spots on the front face thereof by the front bracket 12 through the use of the bolts 25*a*, the vibration isolating bushes 30*a* are inserted at both the spots. By the same token, while the inverter 5 is fixed at the two spots of the rear face thereof by the rear bracket 13 through the use of the bolts 25*b*, the vibration isolating bushes 30*b* are inserted at both the spots.

Each of the vibration isolating bushes 30 has a triple structure with an inner bush 31, a rubber bush 32, and an outer bush 33. Each of these bushes assumes a tubular shape with a flange provided at one end thereof. These bushes are overlapped with one another with their flanges oriented toward the same side. In other words, each of the vibration isolating bushes 30 is structured such that the rubber bush 32 is sandwiched between the flanged tubular inner bush 31 and the flanged tubular outer bush 33, that a tube portion of the inner bush 31 is fitted inside a tube portion of the outer bush 33, and that the flanges overlap with one another.

In the drawing, the tube portion of the inner bush 31 is denoted by a reference symbol 31*a*, the flange of the inner bush 31 is denoted by a reference symbol 31*b*, the tube portion of the outer bush 33 is denoted by a reference symbol 33*a*, and the flange of the outer bush 33 is denoted by a reference symbol 33*b*. The rubber bush 32 is interposed between the tube portion of the inner bush 31 and the tube portion of the outer bush 33, and is also interposed between the flanges.

The vibration isolating bushes 30*a* that are arranged on the front face of the inverter 5 will be described. The vibration isolating bushes 30*a* are opposed to a front face 5*a* of the inverter 5. The vibration isolating bushes 30*a* penetrate the front bracket 12 from the vehicle front side of the front bracket 12 toward the vehicle rear side, and abut on the front face 5*a* of the inverter 5. That is, the tube portion 31*a* of the inner bush 31 abuts at one end thereof on the front face 5*a* of the inverter 5. The flange 33*b* of the outer bush 33 abuts on a front face 12*a* of the front bracket 12, the flange of the rubber bush 32 abuts on a front face of the flange 33*b*, and furthermore, the flange 31*b* of the inner bush 31 abuts on a front face of the flange of the rubber bush 32. It should be noted herein that the front face means a face that is oriented forward with respect to the vehicle. Each of the bolts 25*a* penetrates the inside of the tube portion 31*a* of the inner bush 31. Each of the bolts 25*a* penetrates a corresponding one of the vibration isolating bushes 30*a* and the front bracket 12 with the longitudinal direction thereof oriented substantially perpendicularly to the front face 5*a* of the inverter 5, and is screwed to the front face 5*a* of the inverter 5.

The same holds true for the rear vibration isolating bushes 30*b*. The vibration isolating bushes 30*b* are opposed to the rear face 5*b* of the inverter 5. The vibration isolating bushes 30*b* penetrate the rear bracket 13 from the vehicle rear side of the rear bracket 13 toward the vehicle front side, and abut on the rear face 5*b* of the inverter 5. That is, the tube portion 31*a* of the inner bush 31 abuts at one end thereof on the rear face 5b. The flange 33b of the outer bush 33 of each of the vibration isolating bushes 30b abuts on the rear face 13a of the rear bracket 13, the flange of the rubber bush 32 abuts on the rear face of the flange 33b, and furthermore, the flange 31b of the inner bush 31 abuts on a rear face of the flange of the rubber bush 32. It should be noted herein that the rear face means a face that is oriented rearward with respect to the vehicle. Each of the bolts 25b penetrates the inside of the tube portion 31a of the inner bush 31. Each of the bolts 25b penetrates a corresponding one of the vibration isolating bushes 30b and the rear bracket 13 from the vehicle rear side, with the longitudinal direction thereof oriented substantially perpendicularly to the rear face 5b of the inverter 5, and is screwed to the rear face 5b of the inverter 5.

Figure 6:
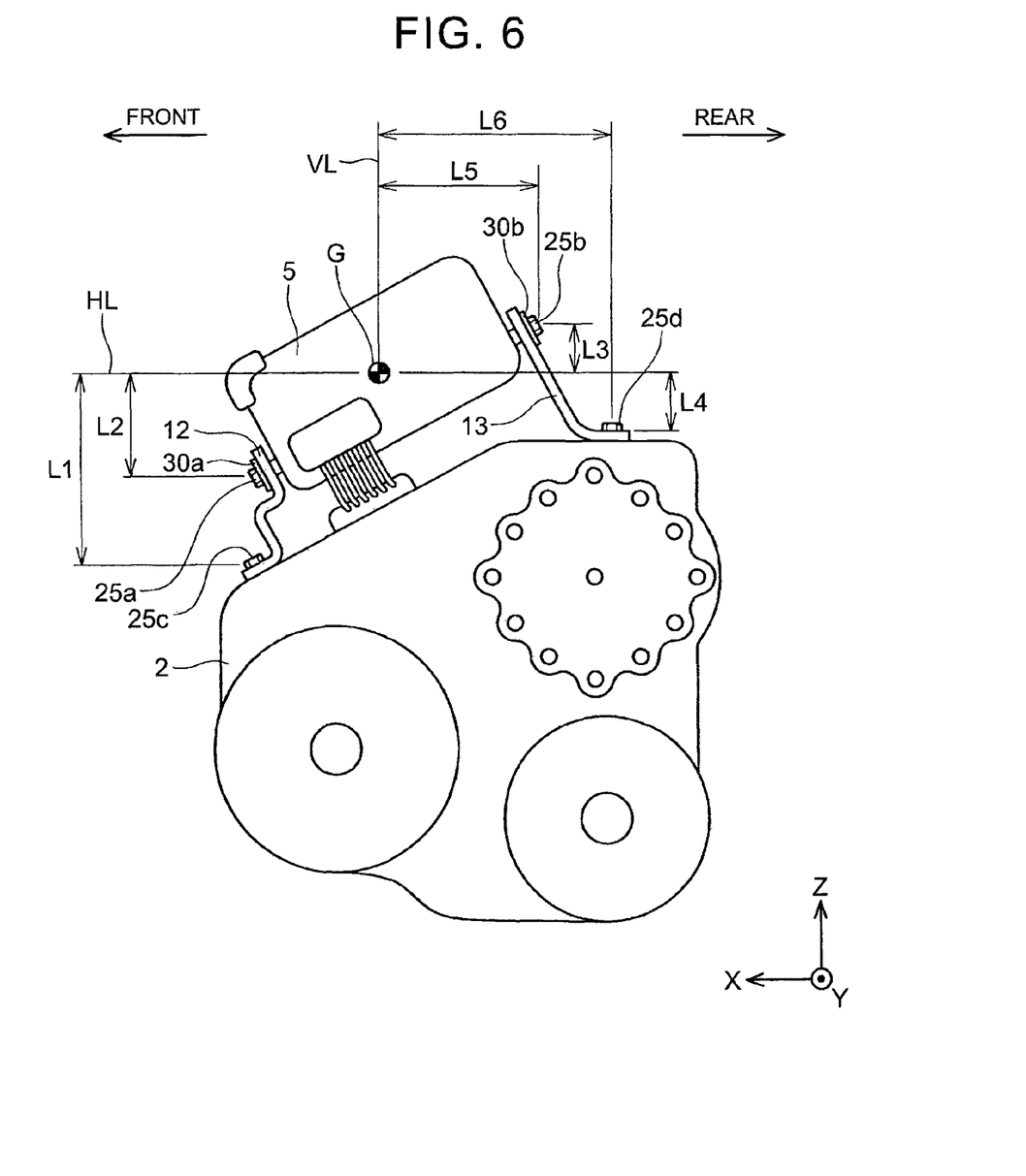
FIG. 6 is a lateral view illustrating a positional relationship between a center of gravity of the inverter and the rubber vibration isolator.

The advantage of the vehicle mounting structure for the inverter 5 will be described with reference to FIG. 6. The vibration isolating bushes 30 are inserted in the fastening portion where the brackets 12 and 13 are fastened to the inverter 5, instead of being inserted in the fastening portion where the brackets 12 and 13 are fastened to the drive train 2. The spots where these vibration isolating bushes 30 are inserted contribute towards reducing the amplitude of vibrations of the inverter 5. The vibration isolating bushes 30 suppress the propagation of vibrations from the drive train 2 to the inverter 5, but the inverter 5 slightly vibrates together with the vibration isolating bushes 30. It is appropriate that the amplitude of vibrations of the inverter 5 be as small as possible. The degree to which the vibration isolating bushes 30 vibrate depends on the positional relationship between the center of gravity of the inverter 5 and the vibration isolating bushes 30. On the other hand, the vibration isolating bushes 30 are attached either between the brackets 12 and 13 and the inverter 5 or between the brackets 12 and 13 and the drive train 2. The distance from the vibration isolating bushes 30 to a center of gravity G of the inverter 5 is shorter in the case where the vibration isolating bushes 30 are arranged between the brackets 12 and 13 and the inverter 5 than in the case where the vibration isolating bushes 30 are arranged between the brackets 12 and 13 and the drive train 2. Accordingly, the amplitude of vibrations of the inverter 5 can be made smaller if the vibration isolating bushes 30 are arranged between the brackets 12 and 13 and the inverter 5. As shown in FIG. 6, a distance L2 between a horizontal line HL passing through the center of gravity G of the inverter 5 and the vibration isolating bushes 30a is shorter than a distance L1 between the fastening portion where the drive train 2 and the front bracket 12 are fastened to each other and the horizontal line HL. The distances L1 and L2 are equivalent to moment arms with respect to the center of gravity G at the time when the inverter 5 sways in the longitudinal direction. The moment arms with respect to the center of gravity G may be smaller in the case where the vibration isolating bushes 30a are inserted in the fastening portion where the inverter 5 and the front bracket 12 are fastened to each other (i.e., at the positions of the bolts 25a) than in the case where the vibration isolating bushes 30a are inserted in the fastening portion where the drive train 2 and the front bracket 12 are fastened to each other (i.e., at the positions of the bolts 25c). The same holds true also for the rear bracket 13 and the vibration isolating bushes 30b that fix the inverter 5 behind. In this case, it is advisable to refer to distances denoted by reference symbols L3 and L4.

Besides, a case where the inverter 5 vertically vibrates will be considered. A distance L5 between a vertical line VL passing through the center of gravity G of the inverter 5 and the vibration isolating bushes 30b is shorter than a distance L6 between the fastening portion where the drive train 2 and the rear bracket 13 are fastened to each other (the positions of the bolts 25d) and the vertical line VL. The distances L5 and L6 are equivalent to moment arms with respect to the center of gravity G at the time when the inverter 5 sways in the vertical direction. The moment arms with respect to the center of gravity G may be smaller in the case where the vibration isolating bushes 30b are inserted in the fastening portion where the inverter 5 and the rear bracket 13 are fastened to each other (at the positions of the bolts 25b) than in the case where the vibration isolating bushes 30b are inserted in the fastening portion where the drive train 2 and the rear bracket 13 are fastened to each other. The same holds true also for the front bracket 12 and the vibration isolating bushes 30a that fix the inverter 5 in front.

Accordingly, the amplitude of vibrations of the inverter 5 can be held smaller in the case where the vibration isolating bushes 30 are inserted between the inverter 5 and the brackets 12 and 13 than in the case where the vibration isolating bushes 30 are inserted between the drive train 2 and the brackets 12 and 13.

Besides, the front vibration isolating bushes 30a penetrate the front bracket 12 from ahead of the vehicle, and is fixed to the front face 5a of the inverter 5. When the inverter 5 receives an impact from ahead, a rearward pulling force is applied to the vibration isolating bushes 30a from the inverter 5. At this time, since the flanges (the flanges 31b and 33b) of the vibration isolating bushes 30a abut on the front face 12a of the front bracket 12, the vibration isolating bushes 30a do not fall off from the front bracket 12.

The rear vibration isolating bushes 30b penetrate the rear bracket 13 from behind the vehicle, and are fixed to the rear face 5b of the inverter 5. That is, the vibration isolating bushes 30a on the vehicle front side and the vibration isolating bushes 30b on the vehicle rear side are basically identical in structure to each other, and are arranged to be opposed to each other. When the inverter 5 receives an impact from behind, a forward pulling force is applied to the vibration isolating bushes 30b from the inverter 5. At this time, since the flanges (the flanges 31b and 33b) of the vibration isolating bushes 30b abut on the rear face 13a of the rear bracket 13, the vibration isolating bushes 30b do not fall off from the rear bracket 13. That is, regardless of whether the inverter 5 receives an impact from ahead of the vehicle or from behind the vehicle, either the front vibration isolating bushes 30 or the rear vibration isolating bushes 30 do not fall off from a corresponding one of the brackets 12 and 13. Therefore, the inverter 5 can be protected. Incidentally, it is sufficient that the vibration isolating bushes 30 be identical in structure to each other in that an elastic member is sandwiched between double flanged tubes, and they may be different in size and shape from each other.

Furthermore, the flange of the rubber bush 32 is fittingly inserted between the flange 31b of the inner bush 31 and the flange 33b of the outer bush 33, and the flange region of the rubber bush softens an impact that is applied to the inverter 5 in the longitudinal direction.

Besides, in response to the impact that is applied to the inverter 5 in the longitudinal direction, either the front vibration isolating bushes 30a or the rear vibration isolating bushes 30b receive a compressive load. The vibration isolating bushes are especially resistant to a compressive load. Therefore, regardless of whether the inverter 5 receives an impact from ahead or from behind, each pair of the front and rear vibration isolating bushes 30a and 30b absorbs the impact well.

The aforementioned vehicle mounting structure of the inverter 5 can also be expressed as follows. Each of the vibration isolating bushes 30 is equipped with the tubular outer bush 33 having the flange at one end thereof, and the tubular inner bush 31 that is provided at one end thereof with the flange 31b whose outer diameter is larger than the inner diameter of the tube portion of the outer bush 33. The front bracket 12 is connected to the front face of the inverter 5 that is oriented forward with respect to the vehicle. The outer bush 33 is arranged such that the flange 33b of the outer bush 33 abuts on the face (the front face 12a) of the front bracket 12 that is oriented forward with respect to the vehicle, and that the tube portion 33a of the outer bush 33 penetrates the front bracket 12. The inner bush 31 is arranged such that the flange 31b of the inner bush 31 is located on the vehicle front side with respect to the flange 33b of the outer bush 33, and that the tube portion 31a of the inner bush 31 penetrates the outer bush 33 and the front bracket 12. The rubber bush 32 (the elastic member) is arranged between the inner bush 31 and the outer bush 33. The bolts 25a penetrate the inner bush 31 in the longitudinal direction thereof from a direction substantially perpendicular to the front face 5a of the inverter 5, tips of the bolts 25a are screwed to the inverter 5, and bolt heads of the bolts 25a abut on the face of the flange 31b of the inner bush 31 on the vehicle front side. The relationship between the rear bracket 13 and the vibration isolating bushes 30b is the same as the aforementioned relationship between the front bracket 12 and the vibration isolating bushes 30a, except in that the front side and the rear side should be replaced with each other.

Figure 7A:
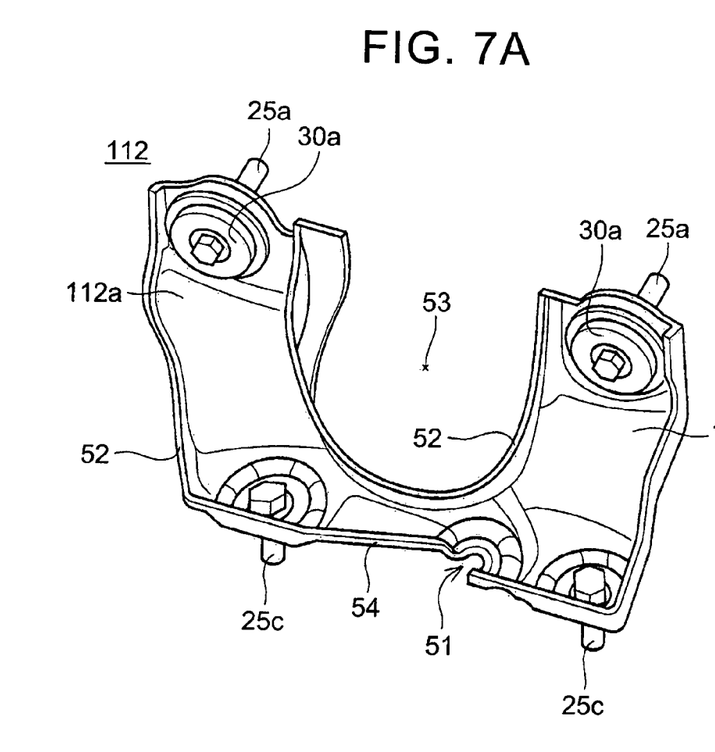
FIG. 7A is a perspective view showing a detailed structure of a front bracket according to an additional embodiment of the invention.
Figure 7B:
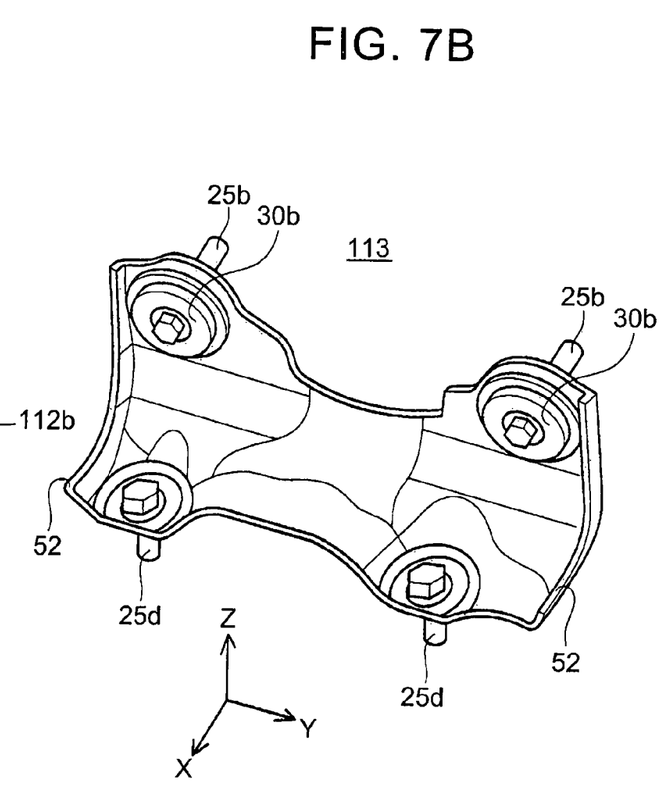
FIG. 7B is a perspective view showing a detailed structure of a rear bracket according to the additional embodiment of the invention.

Next, modification examples of the aforementioned vehicle mounting structure will be described. FIGS. 7A and 7B are perspective views showing brackets assuming another shape. FIG. 7A shows a front bracket 112, and FIG. 7B shows a rear bracket 113. Each of both the front bracket 112 and the rear bracket 113 is equipped with a rib 52 to achieve the enhancement of strength. The front bracket 112 has a large constricted portion 53 between arms 112a and 112b through which the bolts 25a are passed. A noise generation source results from vibrations of a flat plate. However, the constricted portion 53 is provided instead of a flat plate portion between the arms 112a and 112b, whereby the noise caused by the front bracket 112 is reduced. Furthermore, the constricted portion 53 is suited to provide the gap Sp above the drive train 2, fix the inverter 5, and pass a cable and the like therethrough.

Besides, if the inverter 5 is viewed from above (in the negative direction of the Z-axis), a front edge 54 of a region of the front bracket 112 that is fixed to the drive train 2 is inclined rearward with respect to the vehicle (in the negative direction of the X-axis) along the lateral direction with respect to the vehicle (the Y-axis direction), and a groove 51 is provided at an end of the front edge 54 that is located on the vehicle rear side. This front edge 54 and this groove 51 are utilized in positioning the front bracket 112 fixed to the inverter 5 on the drive train 2. A process of attaching the front bracket 112 to the drive train 2 will be described with reference to FIG. 8 and FIG. 9.

Figure 8:
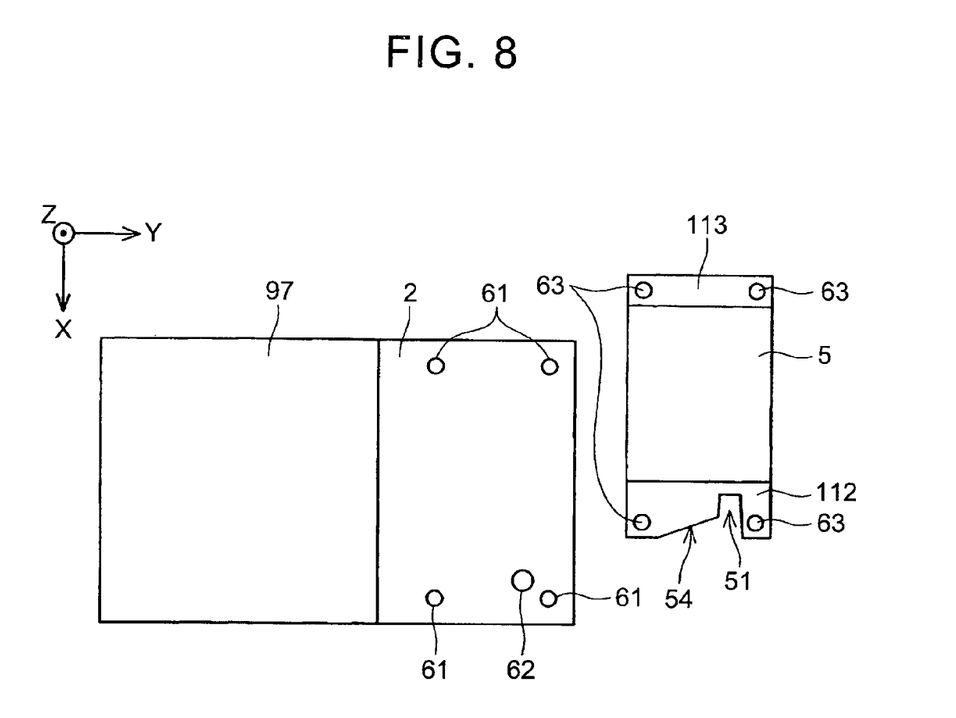
FIG. 8 is a schematic plan view of the drive train and the brackets.

FIG. 8 is a plan view schematically showing an engine 97, the drive train 2, and the inverter 5 to which the brackets 112 and 113 are attached. The upper face of the drive train 2 is provided with bolt holes 61 for attachment of brackets and a guide pin 62 for guiding a front bracket. The front bracket 112 is provided with an inclined front edge 54 that is inclined as viewed from above, and the groove 51 that is located at an end of the inclined front edge 54 on the vehicle rear side. The brackets 112 and 113 are also provided with bolt holes 63. If the inverter 5 to which the brackets are attached is positioned at a predetermined position, the bolt holes 61 of the upper face of the drive train 2 overlap with the bolt holes 63 of the brackets 112 and 113 respectively.

Figure 9A:
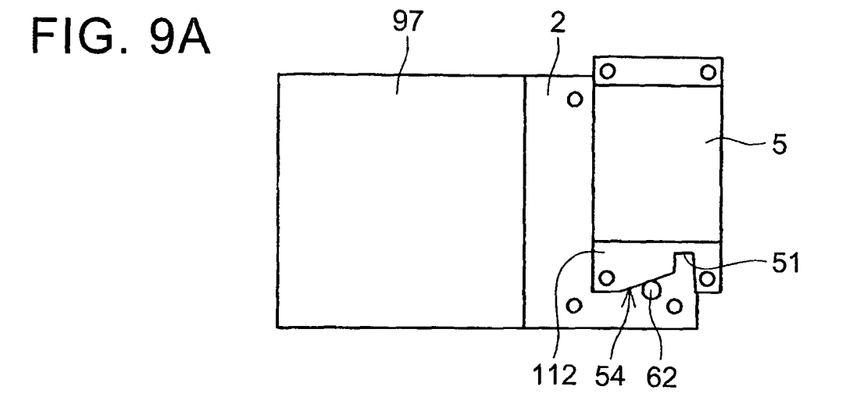
FIGS. 9A to 9C are schematic plan views illustrating a process of attaching the inverter, and show, in the order of FIGS. 9A to 9C, how a guide pin on the drive train guides the front bracket.
Figure 9B:
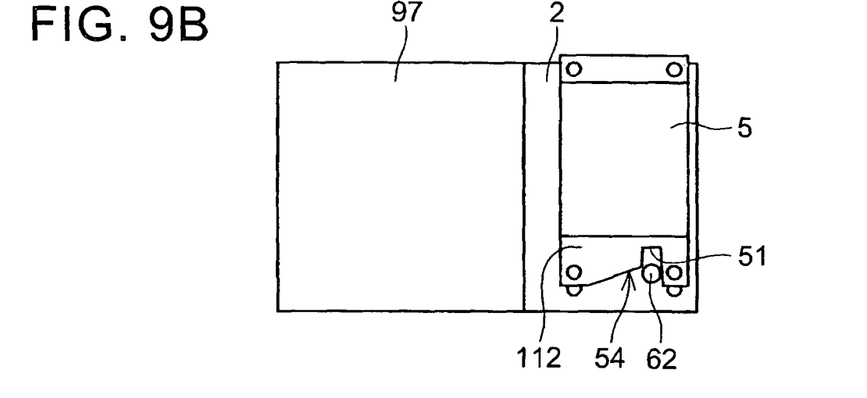
Figure 9C:
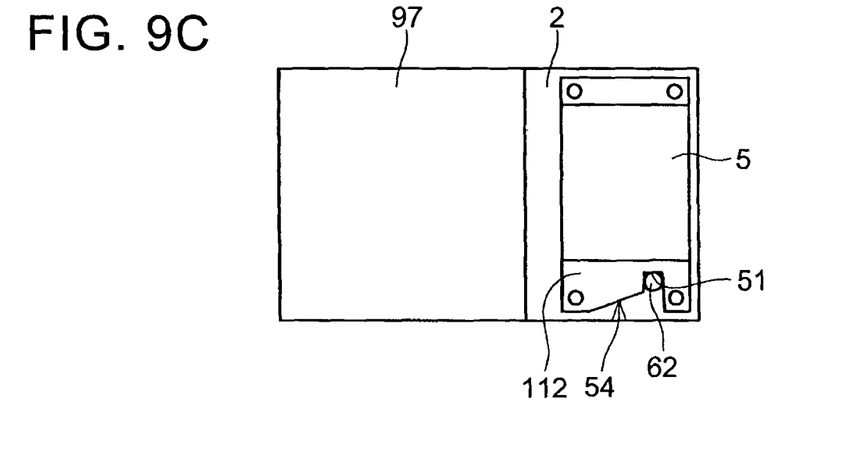

FIGS. 9A to 9C show in this order how the guide pin 62 on the drive train 2 guides the brackets 112 and 113 and the inverter 5 that is fixed to the brackets 112 and 113. First of all, the inverter 5 is moved substantially onto the drive train 2, and then the inclined front edge 54 of the front bracket 112 is brought into abutment on the guide pin 62 (FIG. 9A). The inverter 5 is moved such that the guide pin 62 moves to the groove 51 along the inclined front edge 54 (FIG. 9B). When the guide pin 62 is fitted into the groove 51, the bolt holes 61 and 63 overlap with each other respectively, so that bolts for fixing the brackets 112 and 113 to the drive train 2 can be inserted.

In this manner, the inverter 5 is easily attached to the drive train 2 by providing the front bracket 112 with the inclined front edge 54 and the groove 51 leading thereto, and providing the drive train 2 with the guide pin 62. Incidentally, a similar effect can also be obtained by providing the rear bracket 113 with a similar inclined rear edge and a groove leading thereto, instead of providing the front bracket 112 with the inclined front edge 54 and the groove 51 leading thereto.

The points to remember as to the art described in the embodiments of the invention will be described. The inverter 5 is equivalent to an example of an electronic device as a target for the new vehicle mounting structure disclosed by the present specification. The vehicle mounting structure disclosed by the present specification should not be limited to inverters.

The concrete examples of the invention have been described above in detail, but these are nothing more than exemplifications. The upper face of the drive train 2 is not required to be inclined forward with respect to the vehicle, but may be horizontal. Besides, the inverter 5 is not required to be inclined forward either, but may be horizontally installed on the upper face of the drive train 2. The art set forth in the claims encompasses various modifications and alterations of the concrete examples exemplified above. The technical elements described in the present specification or the drawings exert technical advantages alone or in various combinations, and should not be limited to the combinations set forth in the claims at the time of the filing of the application. Besides, the art exemplified in the present specification or the drawings can achieve a plurality of objects at the same time, and possesses a technical advantage by achieving one of those objects in itself.

What is claimed is:

1. A vehicle mounting structure for an electronic device, comprising:
   a first bracket;
   a drive train on which the electronic device is to be fixed via the first bracket, in such a manner that a gap is defined between the drive train and the electronic device;
   a first vibration isolating bush configured to be provided between the first bracket and the electronic device;
   a first bolt configured to fasten the first bracket and the electronic device via the first vibration isolating bush, wherein
   the first vibration isolating bush includes:
   a first inner bush equipped with a first flange and a first tube portion that has a tubular shape;
   a first outer bush equipped with a second flange and a second tube portion that has a tubular shape, the first tube portion being provided inside the second tube portion, and the first flange and the second flange overlapping with each other; and a first elastic member provided between the first inner bush and the first outer bush, the first bracket is configured to be connected to a front face of the electronic device that is oriented frontward with respect to the vehicle, the first vibration isolating bush is attached such that the second flange abuts on a face of the first bracket that is oriented frontward with respect to the vehicle, and that the second tube portion penetrates the first bracket, the first bolt penetrates the first tube portion, with a longitudinal direction of the first bolt oriented substantially perpendicularly to the front face of the electronic device, a tip of the first bolt being configured to be screwed to the electronic device, and a head of the first bolt abutting on a face of the first flange of the first vibration isolating bush that is oriented frontward with respect to the vehicle, and the first flange abut on the front face of the first bracket.

2. The vehicle mounting structure according to claim 1, further comprising:

a second bracket configured to be connected to a rear face of the electronic device that is oriented rearward with respect to the vehicle;

a second vibration isolating bush that includes:

a second inner bush equipped with a third flange and a third tube portion that has a tubular shape;

a second outer bush equipped with a fourth flange and a fourth tube portion that has a tubular shape, the third tube portion being provided inside the fourth tube portion, and the third flange and the fourth flange overlapping with each other; and a second elastic member provided between the second inner bush and the second outer bush; and a second bolt configured to fasten the second bracket and the electronic device via the second vibration isolating bush, wherein the second vibration isolating bush is attached such that the fourth flange abuts on a face of the second bracket that is oriented rearward with respect to the vehicle, and that the fourth tube portion penetrates the second bracket, and the second bolt penetrates the third tube portion, with a longitudinal direction of the second bolt oriented substantially perpendicularly to the rear face of the electronic device, a tip of the second bolt being configured to be screwed to the electronic device, and a head of the second bolt abutting on a face of the third flange that is oriented rearward with respect to the vehicle.

* * * * *